(12) United States Patent
Kato et al.

(10) Patent No.: US 6,476,968 B1
(45) Date of Patent: Nov. 5, 2002

(54) OPTICAL ELEMENT

(75) Inventors: Hideo Kato, Utsunomiya; Hiroshi Maehara, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/672,316

(22) Filed: Sep. 29, 2000

(30) Foreign Application Priority Data

Sep. 29, 1999 (JP) ............................................. 11-275605

(51) Int. Cl.⁷ ............................................... G02B 27/44
(52) U.S. Cl. ........................ 359/565; 359/569; 359/571; 359/355
(58) Field of Search ................................. 359/350, 355, 359/566, 569, 565, 571, 15, 19

(56) References Cited

U.S. PATENT DOCUMENTS 3,744,870 A  *  7/1973  Tomiki et al. ............... 359/359
5,492,776 A  *  2/1996  Paz-Pujalt .................... 428/696

FOREIGN PATENT DOCUMENTS

EP              921 418 A2    6/1999   ............ G02B/5/18

* cited by examiner

*Primary Examiner*—Cassandra Spyrou
*Assistant Examiner*—Leo Boutsikaris
(74) *Attorney, Agent, or Firm*—Fitzpatrick, Cella, Harper & Scinto

(57) ABSTRACT

Disclosed is an optical element including a substrate made of a monocrystal of a fluoride compound, and a fine structure formed on the substrate and made of a non-monocrystal of metal fluoride. Also disclosed are an optical system having such optical element, and an exposure apparatus having such optical system incorporated therein.

24 Claims, 5 Drawing Sheets

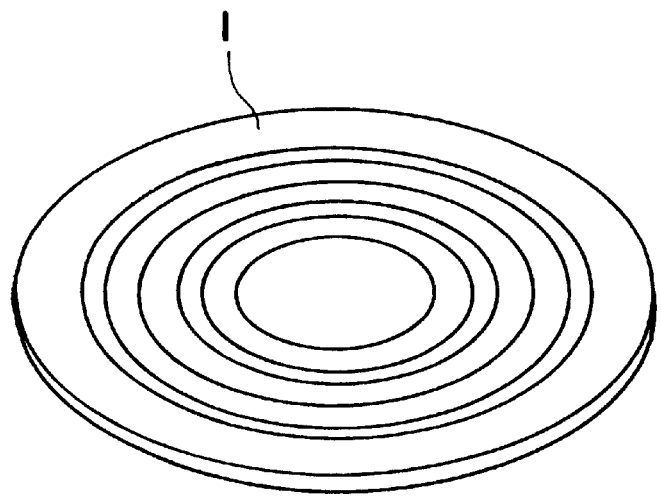
F I G. 1
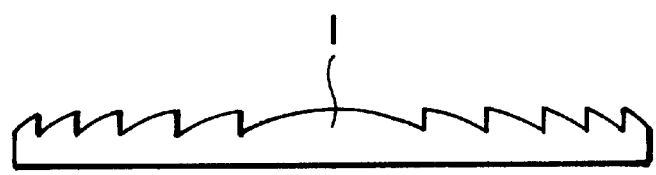
F I G. 2
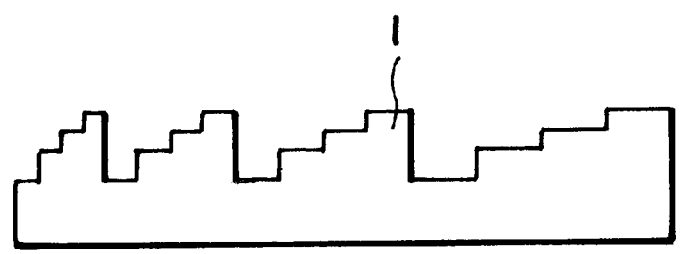
F I G. 3

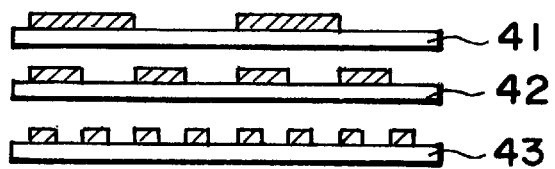
F I G. 7A
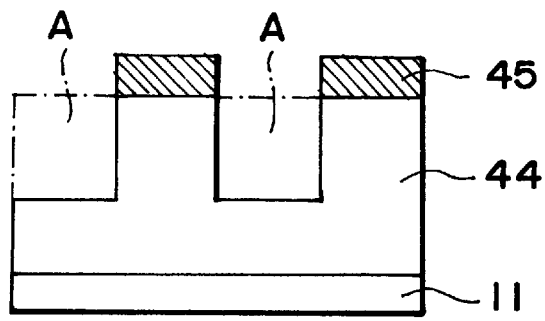
F I G. 7B
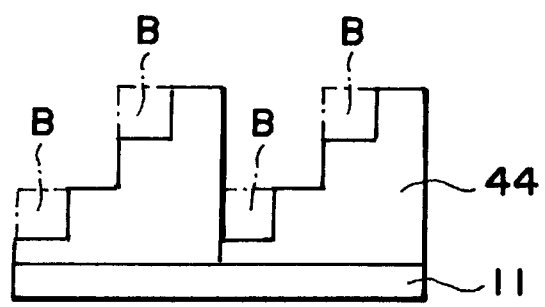
F I G. 7C
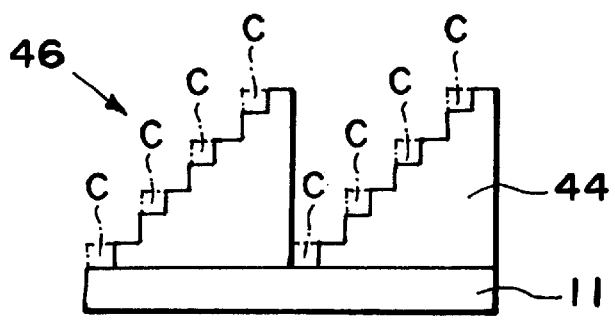
F I G. 7D

OPTICAL ELEMENT

FIELD OF THE INVENTION AND RELATED ART

This invention relates to an optical element suitably usable in an exposure apparatus, a photographic system or an illumination system, for example, specifically in an optical system to be used with ultraviolet rays, visible light rays, or infrared rays and, more particularly, with deep ultraviolet rays or vacuum ultraviolet rays.

Conventionally, a diffraction grating of a certain type is used as a spectroscopic element in a spectroscope. Such diffraction grating has a grating shape of saw-teeth shape, and it is called a blazed type diffraction grating. Diffraction gratings of this type have a high diffraction efficiency which may be close to 100%. Recently, as an optical element using diffraction, binary optics (BO) elements having repetition of a very fine structure of step-like shape have attracted attentions. Particularly, among these elements, a lens called a BO lens and having an achromatic effect or an aspherical effect has attracted much attention because of a development possibility to a unique optical system.

A photographic lens (optical system) for a still camera, for example, to be used with visible light rays, can be produced by a molding method for molding a plastic or glass material by use of a metal mold. However, where a lens (optical system) can be used with light of short wavelength such as ultraviolet rays, use of a material having a ultraviolet-ray transmissibility as well as micro-processing works and a high machining precision are required. Currently, therefore, a molding method or lens materials adapted to this have not yet been developed. Further, the specification as required for a BO lens to be used with light of short wavelength such as ultraviolet rays is much beyond the machining limit (i.e., cutting precision limit) of a blazed type diffraction grating for a current spectroscopic element.

A BO (binary optics) lens to be used with ultraviolet rays or deep ultraviolet rays can be manufactured by using a quartz material. More specifically, an i-line stepper ($\lambda$=365 nm) may be used for an exposure (printing) process, while a parallel flat pate type RIE apparatus may be used for a dry etching process. Thus, on the basis of a photolithographic technology and a dry etching technology, a diffractive optical element having repetitions of a very. fine step-like structure of eight levels (steps) can be produced.

When a high-energy laser beam such as ArF laser light ($\lambda$=194 nm) or KrF laser light ($\lambda$=248 nm) is projected on a quartz material, there occurs contraction. In consideration of it, a fluorite material has become attractive as a substrate material in place of the quartz material. Recently, development of photolithographic projection exposure apparatuses using exposure light in a vacuum ultraviolet region shorter than a wavelength $\lambda$=200 has been desired. As regards a glass material Act constituting an optical system which enables use of such exposure light, the quartz material is insufficient in its performance. The fluorite material (fluoride compound) may be the only glass material that can be used in place of quartz. However, to a monocrystal fluoride material usable as a substrate material, it is difficult to execute a micro-processing operation based on a dry etching process.

SUMMARY OF THE INVENTION

It is an object of the present invention to provide an optical element having a very fine structure and being made by use of a fluoride compound such as fluorite, for example.

In accordance with an aspect of the present invention, there is provided an optical element, comprising: a substrate made of a monocrystal of a fluoride compound; and a fine structure formed on the substrate and made of a non-monocrystal of metal fluoride.

In accordance with another aspect of the present invention, there is provided an optical element, comprising: a substrate made of a monocrystal of a fluoride compound; and a fine structure formed on the substrate by forming, by deposition, a film of non-monocrystal of metal fluoride and by etching the metal fluoride film.

In these aspects of the present invention, the fine structure may be produced in accordance with a photolithographic method and a dry etching method.

The fluoride compound may contain at least one metal fluoride of calcium fluoride, magnesium fluoride, barium fluoride and aluminum fluoride.

A multilayered film comprising metal fluoride and alumina may be used.

A multilayered film comprising metal fluoride and calcium fluoride may be used.

The fine structure may comprise a thin film formed by using one of a sputtering method, an ion beam sputtering method, a CVD method and a vacuum deposition method.

The optical element may further comprise anti-reflection films formed on a top face and a bottom face of the substrate, respectively.

The fine structure may comprise a diffraction rating having a step-like sectional shape.

The fine structure may have one of a spherical surface and an aspherical surface.

In accordance with a further aspect of the present invention, there is provided an optical element, comprising: a substrate made of a monocrystal of a fluoride compound; and a fine structure formed on the substrate and made of a non-monocrystal of a fluoride compound.

In accordance with a yet further aspect of the present invention, there is provided an optical system having an optical element as recited above.

In accordance with a still further aspect of the present invention, there is provided an exposure apparatus including an optical system as recited above.

In accordance with a yet further aspect of the present invention, there is provided a device manufacturing method, comprising the steps of: exposing a workpiece with a device pattern by use of an exposure apparatus as recited above; and developing the exposed workpiece.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is an enlarged and perspective view of a diffractive optical element according to a first embodiment of the present invention.

FIG. 2 is a sectional view of the diffractive optical element of FIG. 1.

FIG. 3 is a sectional view of the diffractive optical element of FIG. 1.

FIGS. 7A–7D are schematic views, respectively, for explaining processes for manufacturing a diffractive optical element according to a fourth embodiment of the present invention.

DESCRIPTION OF THE PREFERRED EMBODIMENTS

Preferred embodiments of the present invention will now be described with reference to the accompanying drawings.

FIG. 1 is a perspective view of a BO (binary optics) lens 1 according to an embodiment of the present invention, and FIG. 2 is a sectional view thereof.

The BO lens 1 has a diameter of 20 mm, and the design wavelength is $\lambda=248$ nm. Thus, it is to be used with KrF laser light and to diffract the same. Formed on the surface of a substrate of this lens are rings of a number about 1800. Each ring has a step-like shape of four levels (steps).

FIG. 3 is a sectional view of four rings of this BO lens 1. For example, in FIG. 3, the outermost ring has such design values that: the width of each step is 0.7 micron, and the height of each step is 0.145 micron. The width of the unit ring is 2.8 microns while the height thereof is 0.434 micron.

Figure 4A:
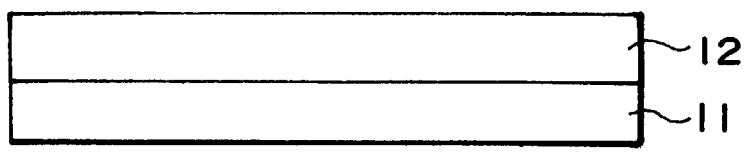
FIGS. 4A and 4B are schematic views, respectively, for explaining processes for manufacturing a diffractive optical element according to the first embodiment of the present invention.
Figure 4B:
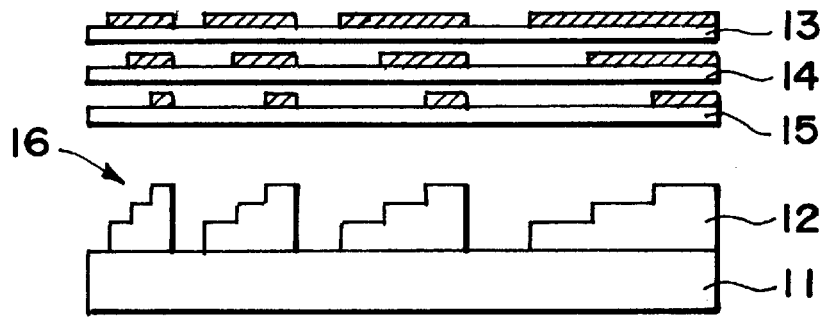

FIGS. 4A and 4B are schematic views for explaining the processes for manufacturing a diffractive optical element (BO lens) in this embodiment. First, as shown in FIG. 4A, a fluorite ($CaF_2$) material of a diameter 2 inches and a thickness 2 mm is used as a substrate 11. A calcium fluoride ($CaF_2$) film 12 of a film thickness 0.43 micron is then formed on the substrate 11 by using a vacuum deposition apparatus of resistance heating type. Subsequently, as shown in FIG. 4B, an i-line stepper (projection exposure apparatus), $\lambda=365$ nm, is used to photoprint a pattern of a chromium mask 13 on a positive type resist material applied to the substrate 11, in a reduced scale. Thereafter, the substrate 11 is treated by a developing process, by which a resist pattern is produced. Then, by using the thus produced resist pattern as a mask, the film 12 is etched in a parallel flat plate type dry etching (RIE) apparatus.

Generally, as regards the etching process for a fluoride compound as represented by fluorite, a chemical etching process using a halogen series dry etching gas can not be applied, and an inactive gas is used in place of it. In this embodiment, a mixture gas of argon and hydrogen is used as an etching gas for etching the $CaF_2$ film 12 on the substrate 11.

Thereafter, while using masks 14 and 15 sequentially, the above-described procedure of exposure process, developing process and etching process is repeated, by which a diffractive optical element 16 having a four-level step-like structure (FIG. 4B) is produced.

The sputter etching speed of the $CaF_2$ film 12 of a non-monocrystal having been formed by a vapor deposition method is higher than that of the substrate 11 made of a monocrystal. Thus, the substrate 11 can function as an etching stopper layer. For high-precision processing, the etching process may preferably be performed while providing etching stopper layers at positions corresponding to each step of the diffractive optical element. The $CaF_2$ film 12 may be formed by using a sputter deposition method, an ion beam deposition method, or a CVD film forming method, for example.

Figure 5:
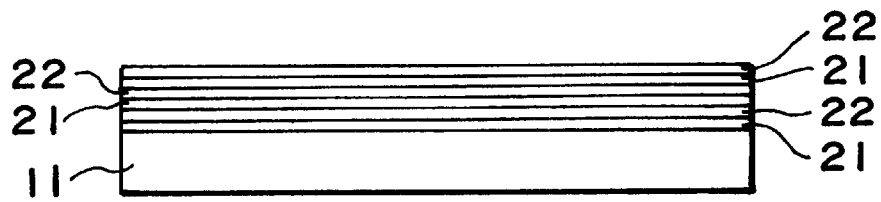
FIG. 5 is a sectional view of a diffractive optical element according to a second embodiment of the present invention.

FIG. 5 is a sectional view of a substrate 11 in a second embodiment of the present invention. Like the first embodiment, a monocrystal substrate 11 of fluorite having a diameter 2 inches and a thickness 2 mm is used. By using a vapor deposition apparatus of resistance heating type, a multilayered film of a film thickness of about 0.43 micron is formed on the substrate 11. More specifically, a $CaF_2$ film 21 of non-monocrystal having a film thickness 1250 angstroms and a barium fluoride ($BaF_2$) film 22 of a film thickness 200 angstroms are superposed as a unit layer of a film thickness 1450 angstroms. By successive vapor deposition, three units layers superposed, whereby a multilayered film of a thickness 0.43 micron is produced.

In this embodiment, like the first embodiment, three masks are used in combination with an i-line stepper for the exposure process. Also, a mixture gas of argon and nitrogen with a mixture ratio of 1:10 is used as an etching gas. By performing an etching process with the gas to the multilayered film of six layers of $CaF_2$ films 21 and $BaF_2$ films 22, formed on the substrate 11, a high precision diffractive optical element of four levels (steps), with each step being defined very sharply, can be produced. Here, the barium fluoride film 22 serves as an etching stopper layer.

In another example, a sputtering vapor deposition apparatus may be used to produce a multilayered film of a film thickness of about 0.43 micron on a fluorite substrate 11, by superposing a $CaF_2$ film of a film thickness 1300 angstroms and an alumina ($Al_2O_3$) film of a film thickness 145 angstroms into a unit layer with a film thickness 1450 angstroms, and by superposing three such unit layers on the substrate through successive vapor deposition.

Then, an i-line stepper may be used for the exposure process, like the first embodiment, in conjunction with three masks. A mixture gas of argon and nitrogen of a mixture ratio of 1:30 may be used as an etching gas, for etching the multilayered film of six layers of $CaF_2$ films and $Al_2O_3$ films on the substrate 11. With this procedure, a high precision diffractive optical element of four levels (steps), with each step being defined very sharply, can be produced.

Figure 6:
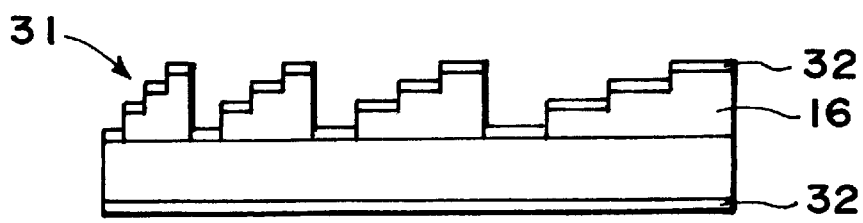
FIG. 6 is a sectional view of a diffractive optical element according to a third embodiment of the present invention.

FIG. 6 is a sectional view of a diffractive optical element 31 according to a third embodiment of the present invention. In this embodiment, there are anti-reflection films 32 on the top and bottom faces of a diffractive optical element 16 of four levels as can be produced by the first embodiment. Each anti-reflection film 32 comprises a lithium fluoride (LiF) film with a film thickness 440 angstroms, which can be formed by a vacuum vapor deposition method, for example. It has been confirmed that, with the measurement using KrF laser light, the diffraction efficiency of the diffractive optical element 31 having anti-reflection films 32 formed thereon is improved by 10%, in average, as compared with that of a diffractive optical element 16 without an anti-reflection film 32.

In place of using LiF film for the anti-reflection film 32, a magnesium fluoride ($MgF_2$) film of a film thickness 434 angstroms and an $Al_2O_3$ film of a film thickness 360 angstroms may be deposited in superposition by using a vacuum deposition method to provide a unit layer and, by superposing two such unit layers, a multilayered film having four layers may be produced. It has been confirmed that, with the measurement using KrF laser light, the diffraction efficiency of the diffractive optical element having such anti-reflection film 32 formed thereon is improved by 16%, in average, as compared with that of a diffractive optical element 16 without an anti-reflection film 32.

FIGS. 7A–7D are schematic views for explaining the processes for producing a diffractive optical element according to a fourth embodiment of the present invention. More specifically, FIG. 7A is a sectional view of chromium masks 41, 42 and 43. FIG. 7B is a sectional view of a non-monocrystal $CaF_2$ layer as an etching process is performed by use of a resist pattern (mask) 45, having been formed by use of the mask 41. First, a metal fluoride film 44 of a predetermined film thickness is formed on a monocrystal fluorite substrate 11 by a vapor deposition method. Then, in accordance with a photolithographic method, a resist pattern 45 is formed. Then, by using the thus defined resist pattern 45 as a mask, a sputtering etching process is performed to remove, by etching, those portions at zones A of the metal fluoride film 44, having a height $4/7$ of the film thickness. Thereafter, to a resist pattern (mask) as can be formed by use of the second chromium mask 42, a sputter etching process is performed to remove, as shown in FIG. 7C, those portions at zones B of the metal fluoride film 44, having a height $2/7$ of the film thickness. Subsequently, to a resist pattern (mask) as can be formed by using the third chromium mask 43, a sputter etching process is performed to remove, as shown in FIG. 7D, those portions at zones C of the metal fluoride film 44, having a height $1/7$ of the film thickness. With this procedure, a diffractive optical element 46 of eight levels (steps), having repetitions of steps, can be produced.

The order of using the chromium masks may be changed to an order of 43, 42 and 41, for example, and, through similar photolithographic and sputter etching processes, a diffractive optical element 46 of eight levels can be produced.

In the fourth embodiment, a diffractive optical element of a diameter 200 mm can be produced through a procedure similar to that of the first embodiment and on the basis of divided exposures using a stepper. Such diffractive optical element may be incorporated into a lens system (for an illumination system or an optical system of a projection system), and the lens system may be incorporated into a stepper having a light source of KrF laser.

Next, an embodiment of a semiconductor device manufacturing method which uses a semiconductor exposure apparatus having an optical system including a diffractive optical element as produced in accordance with any one of the preceding embodiments, will be explained. This exposure apparatus includes a light source which comprises one of a KrF excimer laser, a ArF excimer laser, a $F_2$ excimer laser, etc.

Figure 8:
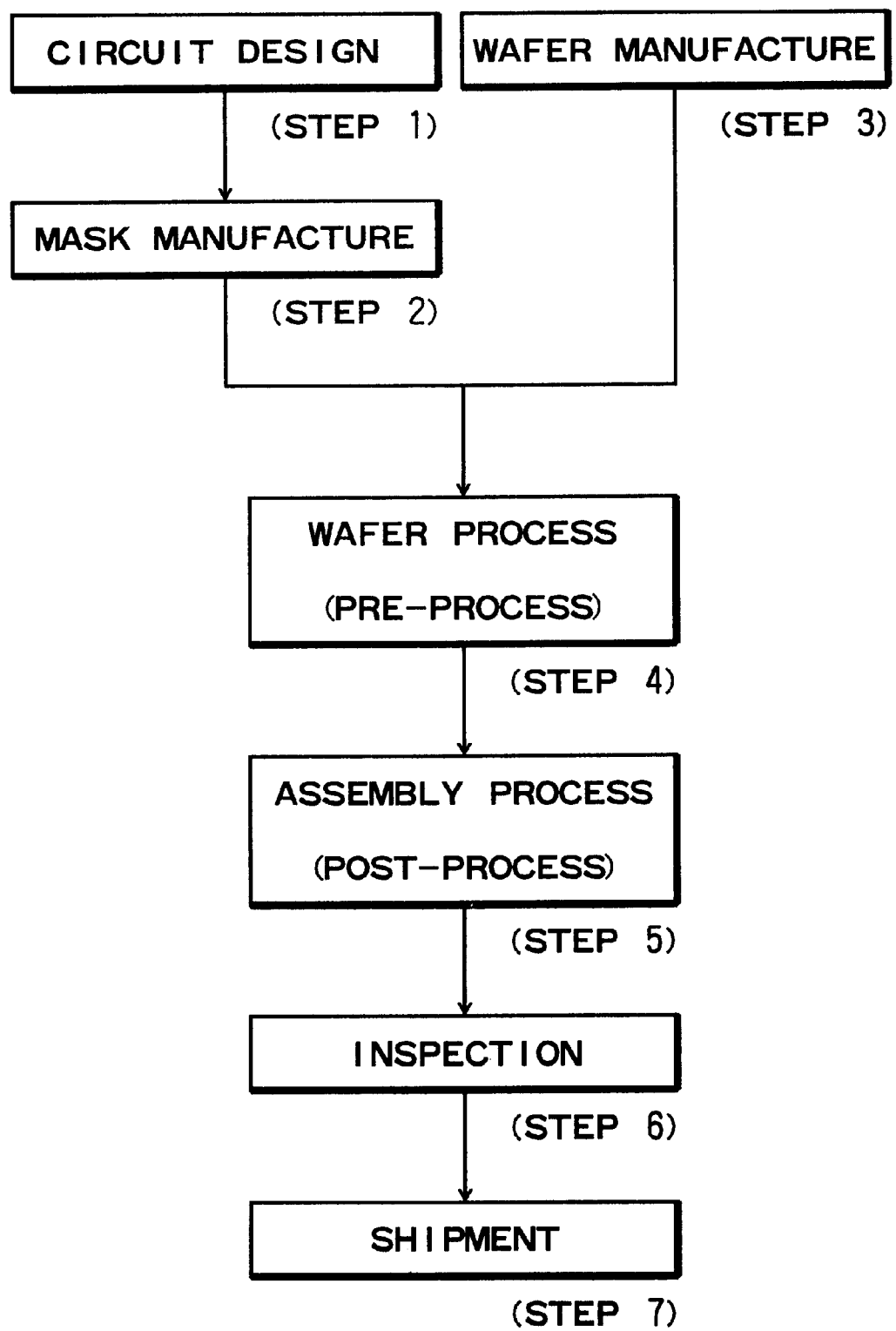
FIG. 8 is a flow chart of semiconductor device manufacturing processes.

FIG. 8 is a flow chart of procedure for manufacture of microdevices such as semiconductor chips (e.g. ICs or LSIs), liquid crystal panels, or CCDs, for example.

Step 1 is a design process for designing a circuit of a semiconductor device. Step 2 is a process for making a mask on the basis of the circuit pattern design. Step 3 is a process for preparing a wafer by using a material such as silicon. Step 4 is a wafer process (called a pre-process) wherein, by using the so prepared mask and wafer, circuits are practically formed on the wafer through lithography. More specifically, the mask is loaded into the semiconductor exposure apparatus and it is conveyed onto and chucked by a mask chuck. A wafer is loaded and, after detecting an alignment error thereof, a wafer stage is moved to complete the alignment. After this, the exposure process is performed. After completion of the exposure process, the wafer is moved stepwise toward the next shot position. Thus, by the lithography, circuit patterns are formed on the wafer.

Step 5 subsequent to this is an assembling step (called a post-process) wherein the wafer having been processed by step 4 is formed into semiconductor chips. This step includes an assembling (dicing and bonding) process and a packaging (chip sealing) process. Step 6 is an inspection step wherein operation check, durability check and so on for the semiconductor devices provided by step 5, are carried out. With these processes, semiconductor devices are completed and they are shipped (step 7).

Figure 9:
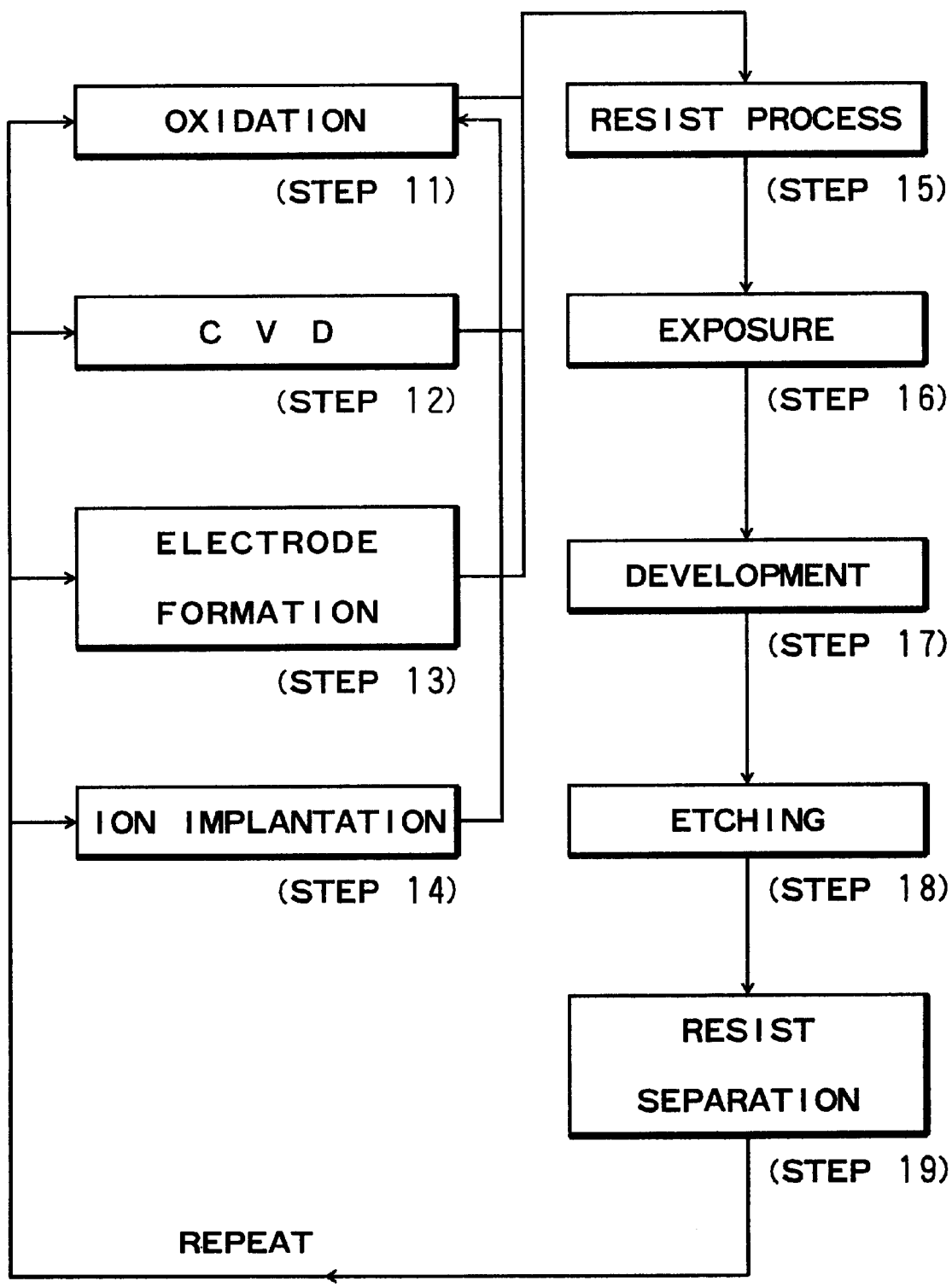
FIG. 9 is a flow chart for explaining details of a wafer process included in the procedure of FIG. 8.

FIG. 9 is a flow chart showing details of the wafer process.

Step 11 is an oxidation process for oxidizing the surface of a wafer. Step 12 is a CVD process for forming an insulating film on the wafer surface. Step 13 is an electrode forming process for forming electrodes upon the wafer by vapor deposition. Step 14 is an ion implanting process for implanting ions to the wafer. Step 15 is a resist process for applying a resist (photosensitive material) to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer.

With these processes, high density microdevices can be manufactured.

In the present invention, the optical element to be produced is not limited to a diffraction grating. An optical element made of metal fluoride such as fluorite, for example, and having a very file structure with a spherical surface or aspherical surface, for example, can be produced.

While the invention has been described with reference to the structures disclosed herein, it is not confined to the details set forth and this application is intended to cover such modifications or changes as may come within the purposes of the improvements or the scope of the following claims.

What is claimed is:

1. An optical element comprising:
   a substrate made of a monocrystal of a fluoride compound; and
   a fine structure formed on the substrate and made only of a non-monocrystal of metal fluoride.

2. An optical element according to claim 1, wherein the fine structure is formed on the substrate by forming, by deposition, a film of said non-monocrystal of metal fluoride and by etching the metal fluoride film.

3. An optical element according to claim 1, wherein the fine structure is produced in accordance with a photolithographic method and a dry etching method.

4. An optical element according to claim 1, wherein the fluoride compound contains at least one metal fluoride of calcium fluoride, magnesium fluoride, barium fluoride and aluminum fluoride.

5. An optical element according to claim 2, wherein said film consists of a multilayered film comprising metal fluoride and calcium fluoride.

6. An optical element according to claim 1, wherein the fine structure comprises a thin film formed by using one of a sputtering method, ion beam sputtering method, a CVD method and a vacuum deposition method.

7. An optical element according to claim 1, further comprising anti-reflection films formed on a top face and a bottom face of the substrate, respectively.

8. An optical element according to claim 1, wherein the fine structure comprises a diffraction grating having a step-like sectional shape.

9. An optical element according to claim 1, wherein the fine structure has one of a spherical surface and an aspherical surface.

10. An optical system having an optical element as recited in claim 1.

11. An exposure apparatus including an optical system as recited in claim 10.

12. A device manufacturing method, comprising the steps of:

exposing a workpiece with a device pattern by use of an exposure apparatus as recited in claim 11; and developing the exposed workpiece.

13. An optical element comprising:

a substrate made of a monocrystal of a fluoride compound; and a fine structure formed on the substrate and made only of a non-monocrystal of calcium fluoride.

14. An optical element according to claim 13, wherein the fine structure is formed on the substrate by forming, by deposition, a film of said non-monocrystal of calcium fluoride and by etching the calcium fluoride film.

15. An optical element according to claim 13, wherein the fine structure is produced in accordance with a photolithographic method and a dry etching method.

16. An optical element according to claim 13, wherein the fluoride compound contains at least one metal fluoride of calcium fluoride, magnesium fluoride, barium fluoride and aluminum fluoride.

17. An optical element according to claim 14, wherein said film consists of a multilayered film.

18. An optical element according to claim 13, wherein the fine structure comprises a thin film formed by using one of a sputtering method, ion beam sputtering method, a CVD method and a vacuum deposition method.

19. An optical element according to claim 13, further comprising anti-reflection films formed on a top face and a bottom face of the substrate, respectively.

20. An optical element according to claim 13, wherein the fine structure comprises a diffraction grating having a step-like sectional shape.

21. An optical element according to claim 13, wherein the fine structure has one of a spherical surface and an aspherical surface.

22. An optical system having an optical element as recited in claim 13.

23. An exposure apparatus including an optical system as recited in claim 22.

24. A device manufacturing method comprising the steps of:

exposing a workpiece with a device pattern by use of an exposure apparatus as recited in claim 23; and developing the exposed workpiece.

* * * * *

UNITED STATES PATENT AND TRADEMARK OFFICE
CERTIFICATE OF CORRECTION

PATENT NO. : 6,476,968 B1
DATED : November 5, 2002
INVENTOR(S) : Hideo Kato et al.

It is certified that error appears in the above-identified patent and that said Letters Patent is hereby corrected as shown below:

Column 1,
Line 18, "optics" should read -- optic --;
Line 29, "a" (second occurrence) should read -- an --;
Line 42, "pate" should read -- plate --;
Line 45, "verg." should read -- very --; and
Line 55, "Act" should be deleted.

Column 2,
Line 29, "rating" should read -- grating --.

Column 3,
Line 50, "can not" should read -- cannot --.

Column 4,
Line 15, "units" should read -- unit --;
Line 35, "deposition." (close up right margin);
Line 36, "Then," (close up left margin) --; and
Line 55, "in" should read -- on --.

Column 5,
Line 2, "in" should read -- on --; and
Line 49, "a" (second occurrence) should read -- an --.

Column 6,
Line 36, "file" should read -- fine --.

Signed and Sealed this

Eighth Day of July, 2003

JAMES E. ROGAN
*Director of the United States Patent and Trademark Office*